United States Patent
Tati et al.

(10) Patent No.: US 10,936,446 B2
(45) Date of Patent: Mar. 2, 2021

(54) EFFICIENT HANDLING OF BLOCK WRITE ATOMICITY

(71) Applicant: VMware, Inc., Palo Alto, CA (US)

(72) Inventors: Kiran Tati, Fremont, CA (US); Rajesh Venkatasubramanian, San Jose, CA (US); Xavier Deguillard, Mountain View, CA (US); Praveen Yedlapalli, Mountain View, CA (US)

(73) Assignee: VMware, Inc., Palo Alto, CA (US)

(*) Notice: Subject to any disclaimer, the term of this patent is extended or adjusted under 35 U.S.C. 154(b) by 456 days.

(21) Appl. No.: 15/889,162

(22) Filed: Feb. 5, 2018

(65) Prior Publication Data

US 2019/0243732 A1    Aug. 8, 2019

(51) Int. Cl.

| | |
|---|---|
| *G06F 11/00* | (2006.01) |
| *G06F 11/14* | (2006.01) |
| *G06F 11/07* | (2006.01) |
| *G06F 9/46* | (2006.01) |
| *G06F 12/02* | (2006.01) |
| *G06F 3/06* | (2006.01) |
| *G06F 9/455* | (2018.01) |
| *G06F 16/18* | (2019.01) |

(52) U.S. Cl.
CPC .......... *G06F 11/1474* (2013.01); *G06F 3/064* (2013.01); *G06F 3/0619* (2013.01); *G06F 3/0659* (2013.01); *G06F 3/0665* (2013.01); *G06F 9/45558* (2013.01); *G06F 9/466* (2013.01); *G06F 11/0745* (2013.01); *G06F 12/0246* (2013.01); *G06F 16/1805* (2019.01); *G06F 2009/45579* (2013.01); *G06F 2009/45583* (2013.01)

(58) Field of Classification Search
CPC . G06F 16/1805; G06F 16/188; G06F 11/1474
See application file for complete search history.

(56) References Cited

U.S. PATENT DOCUMENTS

| | | | | |
|---|---|---|---|---|
| 2007/0162513 | A1* | 7/2007 | Lewin | ................. G06F 16/2358 |
| 2011/0296126 | A1* | 12/2011 | Dematapitiya | ..... G06F 11/1658 711/161 |
| 2017/0185350 | A1* | 6/2017 | Waidhofer | .......... G06F 11/1433 |

* cited by examiner

*Primary Examiner* — Thu Nguyet T Le (57) ABSTRACT

A journal-based process to achieve atomicity in a device driver write operation includes committing a transaction associated with the operation to a journal that include a status indicating the target block is corrupted. Subsequent to committing the transaction, the data is written to the target block. If the write operation is successfully committed, the transaction can be deleted from the journal. If a system crash occurs (e.g., power failure) before the write operation is successfully committed, the transaction remains in the journal and can be used to update block metadata associated with the target block when the system reboots to indicate that it is corrupted; e.g., the target block is a torn write.

20 Claims, 9 Drawing Sheets

EFFICIENT HANDLING OF BLOCK WRITE ATOMICITY

BACKGROUND

The interface to a disk usually deals in blocks; i.e., a user performs read/write operations in chunks of data (blocks), unlike in random access memory (RAM) where the user can read a byte at a time. Traditionally, the disk block size is 512 bytes (B), but storage systems are moving towards 4 KB block size.

In some disks, such as enterprise disks, write operations occur as "atomic" operations. In an atomic write, when a user writes a block, the disk either writes the entire block of data or none of it; the user will not experience a result where the block contains a mix of old and new data. This condition of a block containing partially written data is referred to variously as a "torn write" or "torn data."

Generally, disk drives employ techniques including, pointer switching (also referred to as "swizzling"), journaling, and capacitors, to achieve atomicity. In the case of pointer switching, atomic writes occur by writing data to a block and switching a pointer from the old block to the new block only after data to the new block is committed. The drawback of this scheme is the cost of allocating an extra block, and the cost of managing these extra blocks can be high depending on the implementation.

In the journaling approach, the data is first written into a redo log (journal). The data is written to the target block only after the data is committed to the journal. In the case of a failure, the redo log is replayed to attempt writing the content in the journal to the disk. The journal based solution requires two writes (first to the journal, and then to the disk) for each user write, which effectively halves the available write-bandwidth.

In a capacitor based solution, the block of data is stored in a capacitor bank so that the data can persist for a period of time in case of power failure long enough for the write operation to complete. However, this is a hardware solution (requires physical capacitors), which is not feasible for software based solutions such as virtual disk storage.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

The present disclosure relates to device level write operations that occur at the level of the block storage device where data is written to the block storage device one block at a time; e.g., in unit sizes such as 512 bytes or 4 KB). The present disclosure processes device level write operations using journaling in a persistent memory to provide atomic writes. In various embodiments, when a device level write operation is received, the operation is processed by first committing an error status (flag) indication to a journal entry that is associated with the write operation in the journal. Data is "committed" to persistent storage when there is a positive indication that the data has successfully and completely been written to the persistent storage. After the error status has been committed to the journal, the data is then written to the target data block on the storage device. When the data is committed to the storage device, the journal entry associated with the device level write operation can then be canceled or otherwise removed from the journal.

Processing device level write operations in accordance with the present disclosure omits committing the block data of the write operation to the journal and then to the storage device. Instead, a small amount of data (e.g., on the order of several bytes) is journaled, namely a status and an identifier of the target block on the device. Data blocks can be hundreds of bytes (e.g., some block storage devices use 512B blocks) to thousands of bytes (e.g., some block storage devices use 4 KB blocks), and so the present disclosure provides significant improvement in write-bandwidth over conventional journaling approaches, thus improving the performance of computer systems for data storage. In principal, processing device level write operations in accordance with the present disclosure can realize close to a 100% improvement in write-bandwidth since there is only one write operation of the data, namely to the storage device; the data is written to the storage device without first being writing to the journal.

Processing device level write operations in accordance with the present disclosure writes an error status into the journal as a default result of the write operation. In particular, the error status is committed to the journal before writing data to the storage device. When a failure occurs (e.g., power loss) while writing to the disk, the write operation is lost but the default error status is retained in the journal. This error status can be used during a subsequent read of the target block, which can serve to indicate that the write operation failed. The present disclosure, therefore, improves operation of the computer at the level of the storage device by providing an immediate indication (e.g., CORRUPT BLOCK) that the write operation failed, thus informing the user of the error without requiring the user to keep track of write operations at the application level. By comparison, conventional journaling approaches do not provide information as to whether or not the write operation has failed; recovery silently occurs in the background at an appropriate time. Accordingly, when the user reads the target block in a conventional system, there may be no indication whether the data from the read operation is old data or new data; and the data may even be corrupt. Such a determination requires data management at the application level.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
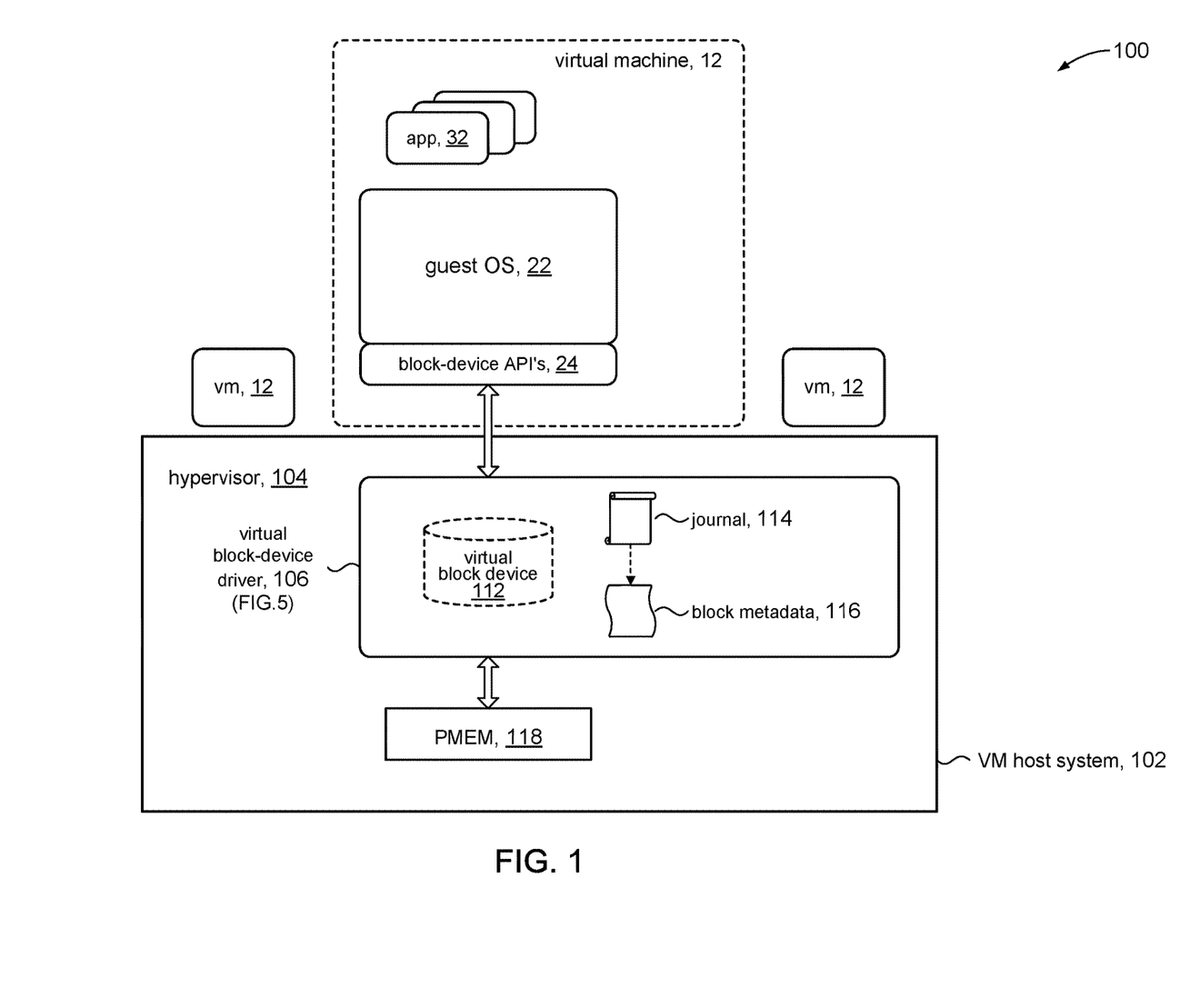
FIG. 1 shows an embodiment of a system that includes journaled-based atomic writes in accordance with the present disclosure.

Referring to FIG. 1, in some embodiments a computer system 100 in accordance with the present disclosure can include a virtual machine (VM) host system 102 to support one or more virtual machines 12. The VM host system 102 can include a hypervisor 104 (e.g., the ESXi® hypervisor by VMware Inc.) that is configured to share the physical resources (e.g., CPU logic, memory, storage, network access, etc.) that comprise the VM host system 102 amongst the virtual machines 12. The hypervisor 104 can emulate the hardware (CPU logic, memory, etc.) of a physical computer system and various external devices that the physical computer system can connect to in order provide a virtual hardware platform for a virtual machine 12. The hypervisor 104 can emulate multiple virtual hardware platforms that are isolated from each other, allowing virtual machines to run different operating systems on the same underlying physical host.

Virtual machines 12 instantiated in the host system 102 can execute a guest operating system (OS) 22, which in turn can support the execution of one or more applications 32. The guest OS 22 can be configured to access disk storage, for example, via a set of block-device application programming interfaces (APIs) 24. In various embodiments, for example, the block-device APIs 24 can be implemented in accordance with various industry standards such as the Small Computer System Interface (SCSI) standards, Non-Volatile Memory Express (NVMe) standards, Integrated Device Electronics (IDE) standards, and so on. The underlying software or firmware that implement the block-device APIs 24 can be collectively referred to as device drivers. Although not shown, in some embodiments, some virtual machines 12 can be configured to support a virtualization technology known people of ordinary skill as "containers" (Docker, Inc., for example, is a known provider of container platforms). More generally, embodiments in accordance with the present disclosure can be practiced with other virtualization technologies.

In accordance with some embodiments, the hypervisor 104 can include a virtual block-device driver 106 to expose one or more instances of a virtual block device 112 to the virtual machines 12. Data transfer occurs in units of blocks (block I/O), which are conventionally 512 bytes (B) or 4 KB in size but can be any suitable size. The virtual block-device driver 106 can be configured to support atomic write operations from the guest OS 22, which guarantees that each write operation either completes or does not complete. In other words, the virtual block-device driver 106 will either write all of the data to the target block or will indicate that none of the data was written to the target block.

In accordance with the present disclosure, the virtual block-device driver 106 can include a journal 114 and block metadata 116 to support the atomic write capability. The journal 114 can store entries relating to write operations issued to the virtual block device 112. The block metadata 116 can be used to provide a status of each (virtual) block that comprises the virtual block device 112. In some embodiments, the virtual block-device driver 106 can include processing of entries in the journal 114 to update the block metadata 116. The interplay between the journal 114 and the block metadata 116 is discussed in more detail below.

In accordance with some embodiments, the VM host system 102 can include a persistent memory 118 that provides the underlying physical storage for the virtual block device 112. Persistent memory can be a solid-state memory (e.g., flash memory) that retains data without refreshing the data in the device, including when power to the device is removed. While the virtual block-device driver 106 exposes a block I/O interface for the virtual machines 12, the persistent memory 118 is not restricted to block I/O and can be a byte-addressable memory.

The journal 114 and the block metadata 116 can comprise persistent storage. In some embodiments, for example, the journal 114 and block metadata 116 can be part of the persistent memory 118. In other embodiments, the journal 114 and block metadata 116 can be stored in a persistent storage device (not shown) that is separate from persistent memory 118.

Figure 2:
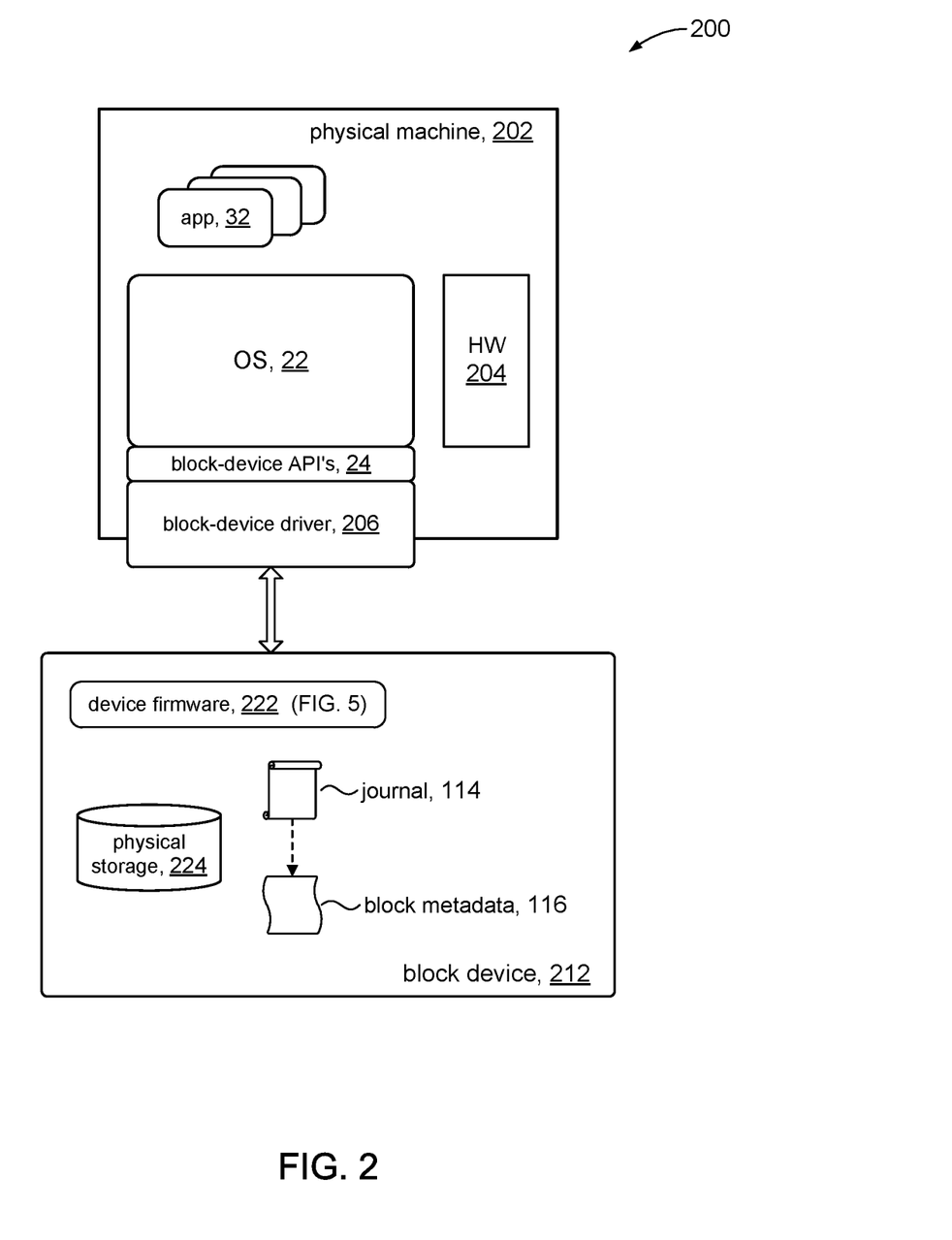
FIG. 2 shows another embodiment of a system that includes journaled-based atomic writes in accordance with the present disclosure.

Referring to FIG. 2, a computer system 200 comprising a physical machine 202 is described to illustrate that some embodiments of the present disclosure can be implemented in a physical computer system as compared to a virtual environment such as shown in FIG. 1. The physical machine 202 can include hardware elements 204 such as a CPU, memory (RAM), etc., to support the execution of an OS 22 and applications 32, and in some embodiments (not shown) the physical machine 202 can be configured to support containers. The physical machine 202 can be connected to a physical block-based storage device 212. A block-device driver 206 can provide access to the physical block-based storage device 212 via the block-device APIs 24.

Device firmware 222 in the physical block-based storage device 212 can provide atomic block-based I/O with the underlying physical storage 224 in accordance with the present disclosure using the journal 114 and the block metadata 116. Similar to the embodiment shown in FIG. 1, the journal 114 can store entries relating to write operations issued to the physical block-based storage device 212. Likewise, the block metadata 116 can be used to provide a status of each block stored on the physical block-based storage device 212. In some embodiments, the journal 114 and the block metadata 116 can be allocated from physical storage 224. In some embodiments according to the present disclosure, the device firmware 222 can include processing of entries in the journal 114 to update the block metadata 116, for example, as part of a startup sequence in the physical block-based storage device 212. Processing by the device firmware 222 is discussed below.

Figure 3:
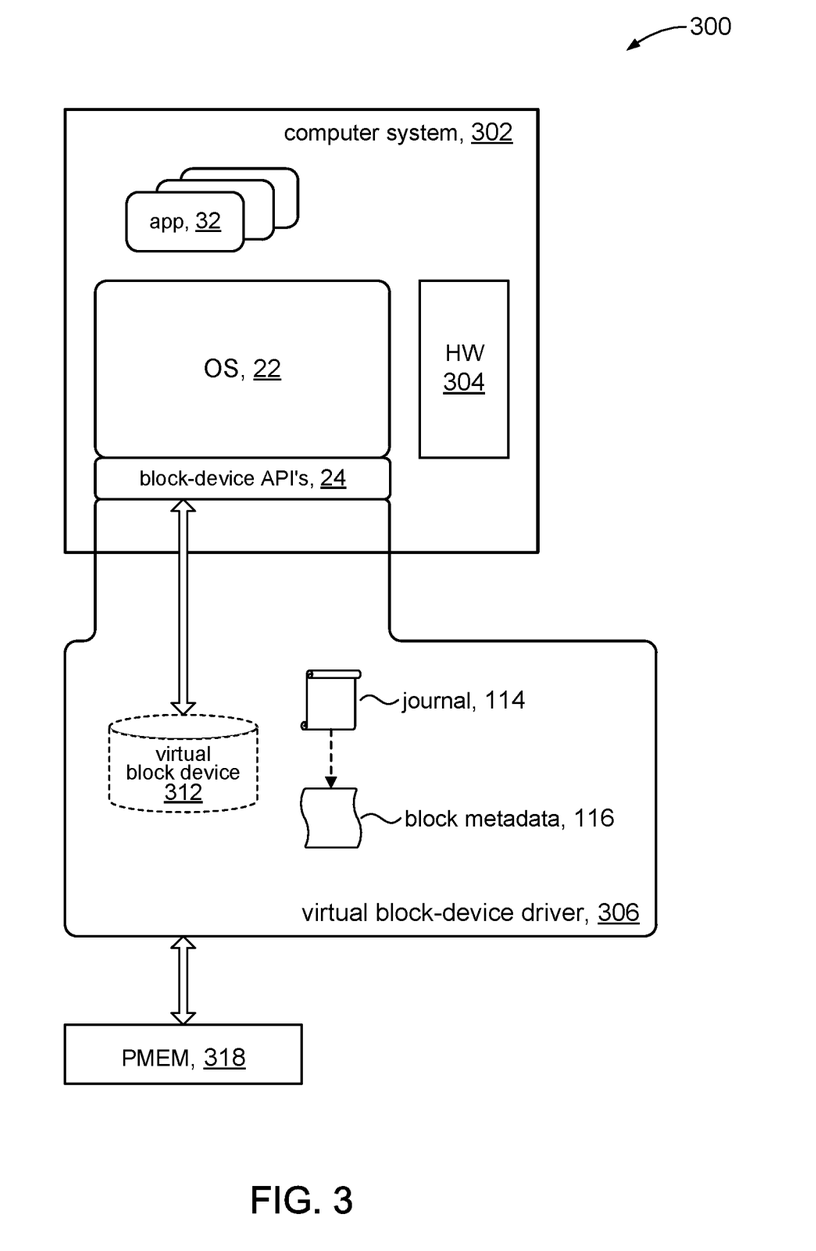
FIG. 3 shows still another embodiment of a system that includes journaled-based atomic writes in accordance with the present disclosure.

Referring to FIG. 3, a computer system 300 in some embodiments in accordance with the present disclosure can comprise a physical machine 302. The physical machine 302 can include hardware elements 304 such as a CPU, memory (RAM), etc., to support the execution of an OS 22 and applications 32. The physical machine 302 in accordance with some embodiments can include a block-device driver 306 that exposes a virtual block device 312 to the OS 22 via the block-device APIs 24. The physical machine 302 can include a persistent memory 318 to provide the underlying physical storage for the virtual block device 312.

The block-device driver 306 can be configured to provide atomic block-based I/O with the virtual block device 312 in accordance with the present disclosure using the journal 114 and the block metadata 116. The block-device driver 306 can process entries in the journal 114 to update the block metadata 116 as part of its startup process. In some embodiments, the journal 114 and the block metadata 116 can be allocated from the persistent memory 318. Processing by the block-device driver 306 is discussed below.

Figure 4:
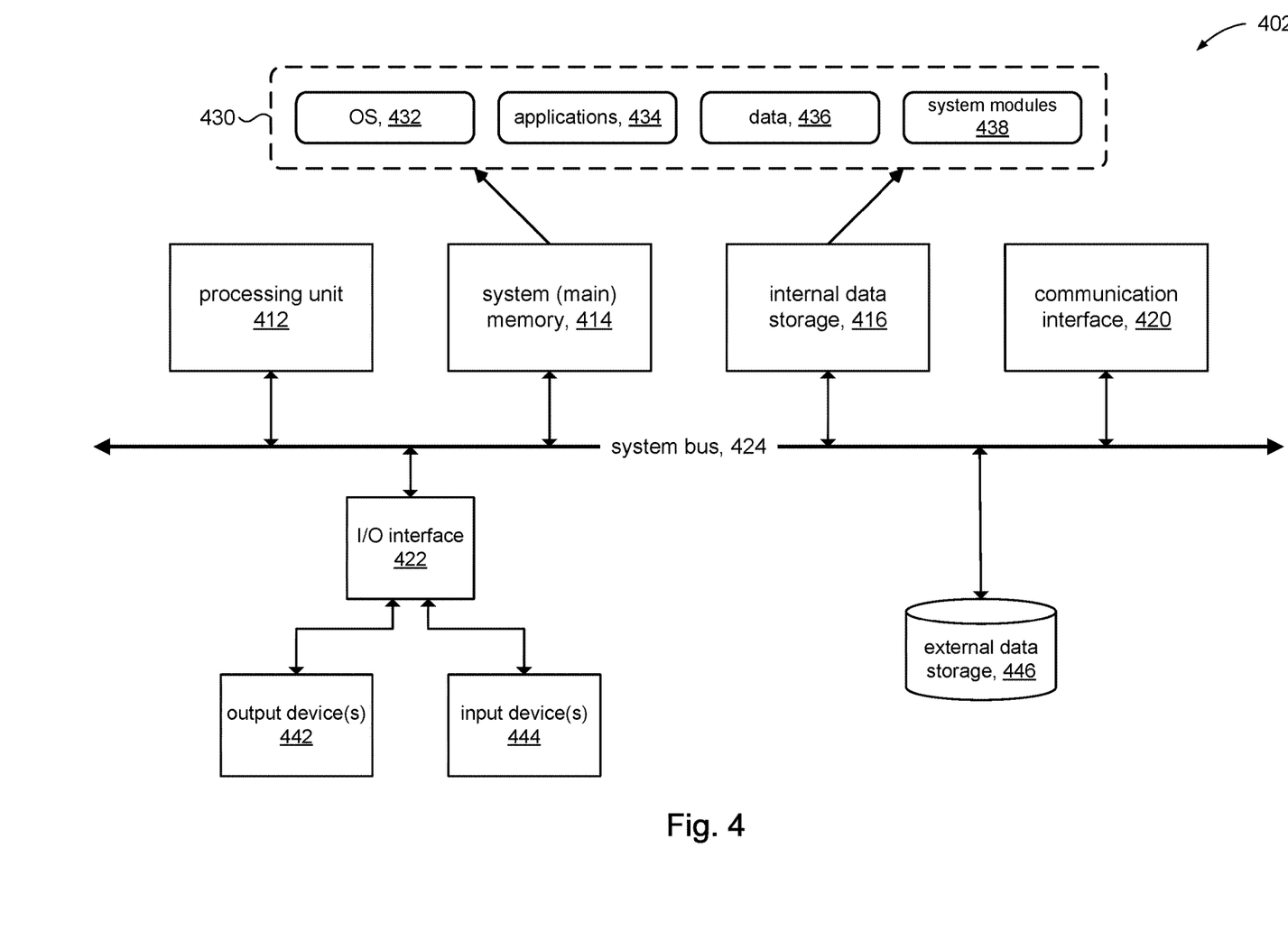
FIG. 4 illustrates a high level block diagram of a computer system in accordance with the present disclosure.

FIG. 4 is a simplified block diagram of an illustrative computing system 402 for implementing one or more of the embodiments described herein; e.g., VM host system 102, physical block-based storage device 212, and physical machine 302. The computing system 402 may perform and/or be a means for performing, either alone or in combination with other elements, operations in accordance with the present disclosure. Computing system 402 may also perform and/or be a means for performing any other steps, methods, or processes described herein.

Computing system 402 can include any single or multi-processor computing device or system capable of executing computer-readable instructions. Examples of computing system 402 include, for example, workstations, laptops, client-side terminals, servers, distributed computing systems, and the like. In a basic configuration, computing system 402 can include at least one processing unit 412 and a system (main) memory 414.

Processing unit 412 can comprise any type or form of processing unit capable of processing data or interpreting and executing instructions. The processing unit 412 can be a single processor configuration in some embodiments, and in other embodiments can be a multi-processor architecture comprising one or more computer processors. In some embodiments, processing unit 412 may receive instructions from program and data modules 430. These instructions may cause processing unit 412 to perform operations in accordance with the present disclosure.

System memory 414 (sometimes referred to as main memory) can be any type or form of volatile or non-volatile storage device or medium capable of storing data and/or other computer-readable instructions. Examples of system memory 414 include, for example, random access memory (RAM), read only memory (ROM), or any other suitable memory device. In some embodiments computing system 402 may include a non-volatile storage device (e.g., data storage 416, 446). In some embodiments, for example, data storage 446 can be persistent memory 118 shown in FIG. 1.

In some embodiments, computing system 402 can also include one or more components or elements in addition to processing unit 412 and system memory 414. For example, as illustrated in FIG. 4, computing system 402 may include internal data storage 416, a communication interface 420, and an I/O interface 422 interconnected via a system bus 424. System bus 424 can include any type or form of infrastructure capable of facilitating communication between one or more components comprising computing system 402. Examples of system bus 424 include, for example, a communication bus (such as an ISA, PCI, PCIe, or similar bus) and a network.

Internal data storage 416 may comprise non-transitory computer-readable storage media to provide nonvolatile storage of data, data structures, computer-executable instructions, and so forth to operate computing system 402 in accordance with the present disclosure. For instance, the internal data storage 416 may store various program and data modules 430, including for example, operating system 432, one or more application programs 434, program data 436, and other program/system modules 438. In some embodiments, for example, the system modules 438 may include virtual block-device driver 106 shown in FIG. 1, block-device driver 206 shown in FIG. 2, or block-device driver 306 shown in FIG. 3.

Communication interface 420 can include any type or form of communication device or adapter capable of facilitating communication between computing system 402 and one or more additional devices. For example, in some embodiments communication interface 420 may facilitate communication between computing system 402 and a private or public network including additional computing systems. Examples of communication interface 420 include, for example, a wired network interface (such as a network interface card), a wireless network interface (such as a wireless network interface card), a modem, and any other suitable interface.

In some embodiments, communication interface 420 may also represent a host adapter configured to facilitate communication between computing system 402 and one or more additional network or storage devices via an external bus or communications channel.

Computing system 402 may also include at least one output device 442 (e.g., a display) coupled to system bus 424 via I/O interface 422. The output device 442 can include any type or form of device capable of visual and/or audio presentation of information received from I/O interface 422.

Computing system 402 may also include at least one input device 444 coupled to system bus 424 via I/O interface 422. Input device 444 can include any type or form of input device capable of providing input, either computer or human generated, to computing system 402. Examples of input device 444 include, for example, a keyboard, a pointing device, a speech recognition device, or any other input device.

Processing of the Journal During Write Operations

Figure 5:
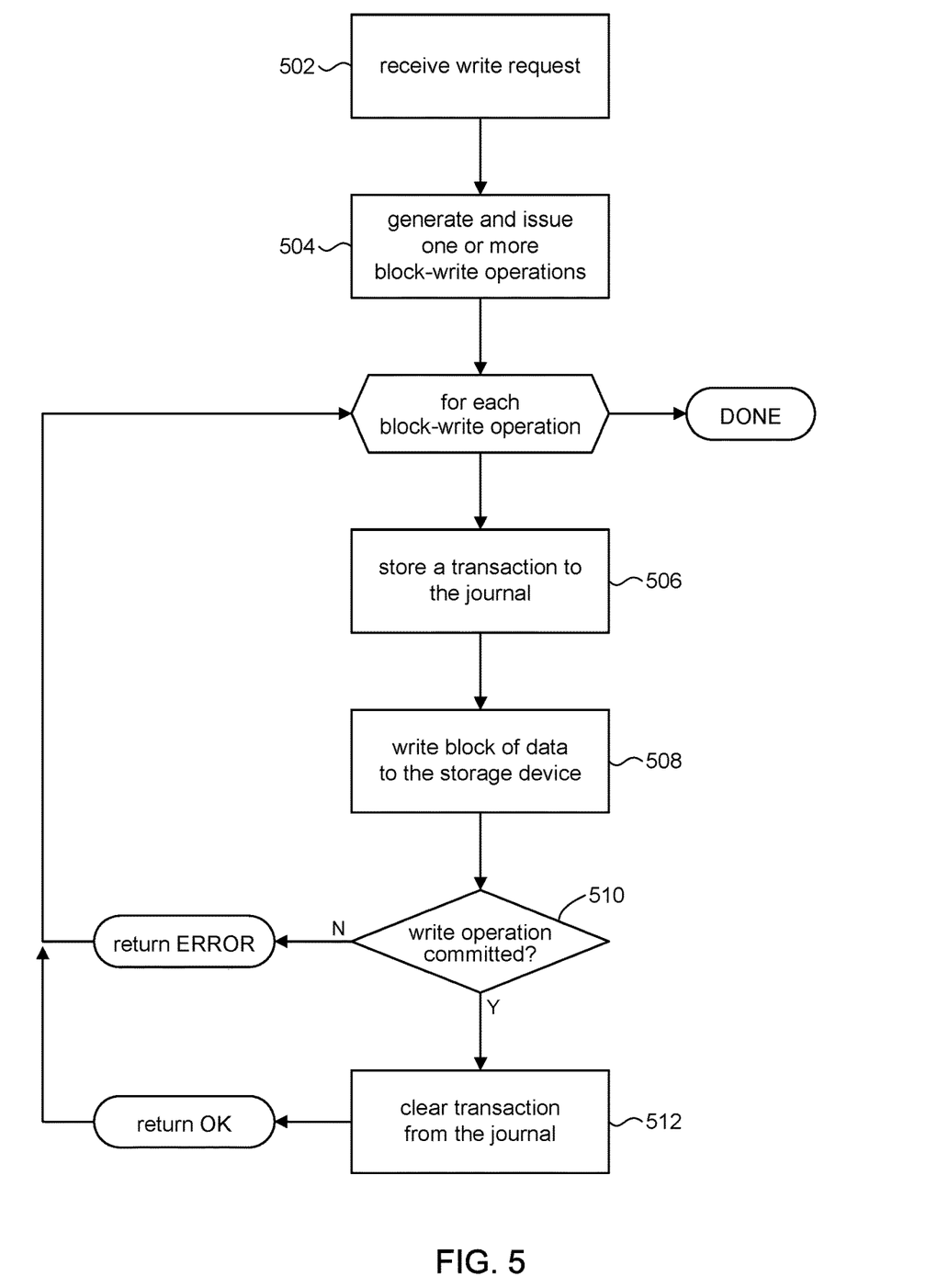
FIG. 5 shows a workflow for processing a journaled-based device driver write operation in accordance with the present disclosure.

Referring to FIG. 5, the discussion will now turn to a high level description of processing in accordance with the present disclosure to provide atomic writes in accordance with the present disclosure on a block storage device (e.g., virtual block device 112 in FIG. 1, physical block device 212 in FIG. 2). The description will use as an example, the virtualized block storage device such as shown in FIGS. 1 and 3, where the processing can be performed by the virtual block-device driver. In some embodiments, for example, the block-device driver can include computer executable program code, which when executed by a computer system (e.g., 402, FIG. 4), may cause the computer system to perform the processing in accordance with FIG. 5. The following description will note differences for embodiments that use a physical block storage device such shown in FIG. 2, where processing in accordance with FIG. 5 can be performed by the device firmware.

At operation 502, the operating system (e.g., OS 22) can receive an application level write request from an application executing on top of the OS. The write request can include a pointer to memory that contains the data to be written and a count of the number of bytes of data. At this level, the write request can be byte oriented; the write request can specify an arbitrary number of bytes and is not necessarily limited to the block size (or an integral multiple of the block size) of the underlying block storage device.

At operation 504, the operating system can process the application level write operation to generate one or more device level block-write operations. In some embodiments, for example, each block-write operation can serve to write out a block of data to the underlying block storage device. For each block-write operation, the operating system can invoke the block-device driver (e.g., 106, FIG. 1) via a suitable block-device API (e.g., 24, FIG. 1). In some embodiments, each invocation can include an identifier of a target block on the block storage device to receive the block of data, and a pointer in memory to the block of data to be written.

At operation 506, the virtual block-device driver can store a transaction to the journal (e.g., 114, FIG. 1) that is associated with the block-write operation. In some embodiments, for example, the transaction can include the identifier that identifies the target block in the storage device. In accordance with the present disclosure, the transaction can further include a status flag or other suitable information that indicates the write operation resulted in an error. In some embodiments where the block storage device is in accordance with a standard such as SCSI, NVMe, etc., the status can be an error code defined under that standard. In some embodiments, for example, the status can be an error code that indicates the block is corrupted. In embodiments, where the block storage device is a physical device (e.g., FIG. 2), this operation can be performed in the device firmware.

It is noted that the transaction, in accordance with the present disclosure, indicates an error status for the write operation prior to actually writing the block of data to the block storage device. It is further noted that the transaction does not include a copy of the block of data to be written. In some embodiments, the block-device driver can wait for confirmation that the transaction has been stored in (committed to) the journal before proceeding to the next operation. This guarantees that the transaction is committed to the journal in case a power failure occurs before the block write operation completes. This aspect of the present disclosure is discussed below.

At operation 508, the virtual block-device driver can write the block of data to the block storage device. In the case of a virtual block device such as depicted in FIG. 1, for example, the block of data can be stored in the persistent memory 118 that is used to emulate the virtual block device. In embodiments, where the block storage device is a physical device, this operation can be performed in the device firmware to write the block of data to the physical storage.

At operation 510, if the write operation completes (e.g., the data is committed to the block storage device), the virtual block-device driver can proceed to operation 512 ('Y' branch) to clear or otherwise delete the transaction from the journal (operation 512) and return an OK code to the operating system. In some embodiments, for example, hardware signals from the persistent memory (e.g., 118 FIG. 1) or the physical block device (e.g., 212, FIG. 2) can provide an indication that the block of data has been committed to storage.

If at operation 510, the write operation is not committed, for example due to an actual failure in physical storage (e.g., PMEM 118), the virtual block-device driver can return an error code to the operating system ('N' branch), where the OS can take appropriate action. In addition, the block-device driver can mark the block as corrupted in the block metadata and clear or otherwise delete the transaction from the journal. In embodiments, where the block storage device is a physical device, this operation can be performed in the device firmware.

If during the write operation, a catastrophic event occurs where the computer system is shut down and the software (OS, block-device driver, etc.) is no longer running, the data may not committed to the target block and the target block may be in an indeterminate state. This is sometimes referred to as a "torn write." A torn write may occur, for example, when the computer system shuts down due to a power failure, someone hitting a reset button, and so on in the middle of the write operation. Since the software is no longer running, the block metadata cannot be updated. In addition, as explained above, since the transaction associated with the block-write operation is committed to the journal before initiating the write operation, the transaction remains in the journal and survives the catastrophic event. The discussion will now turn to a description of how the journal and block metadata in accordance with the present disclosure can ensure that the write operation is atomic despite that a catastrophic event has occurred during the write operation.

Processing of the Journal and the Metadata During Boot Up

Figure 6:
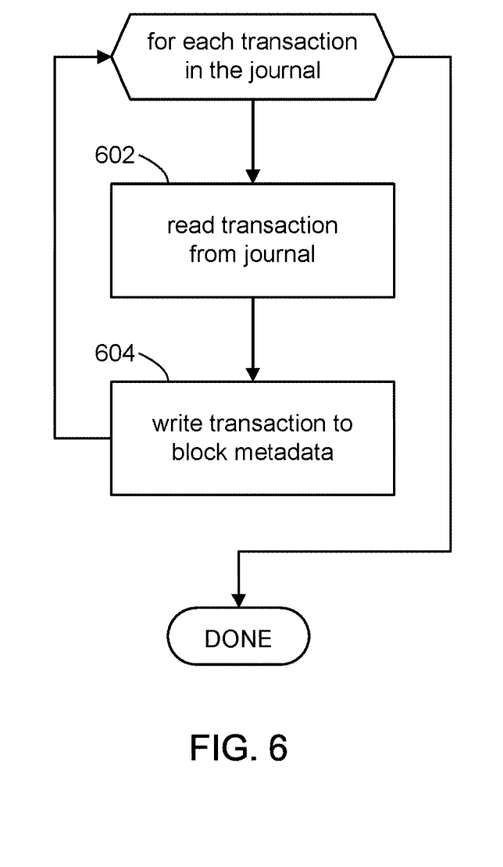
FIG. 6 shows a workflow for processing journal entries during a boot up sequence.

Referring to FIG. 6, the discussion will now turn to a high level description of processing in accordance the present disclosure when the computer system (e.g., virtual machine 12, FIG. 1 or physical machine 202, FIG. 2) is powered on or rebooted. Generally, as part of the boot up process, transactions in the journal 114 can be "replayed." The description will use as an example, the virtualized block storage device such as shown in FIGS. 1 and 3, where the processing can be performed by the virtual block-device driver during the boot up process. In some embodiments, for example, the block-device driver can include computer executable program code, which when executed by a computer system (e.g., 402, FIG. 4), may cause the computer system to perform the processing in accordance with FIG. 6. The following description will note differences for embodiments that use a physical block storage device such shown in FIG. 2, where processing in accordance with FIG. 6 can be performed by the device firmware during boot up of the physical storage device.

At operation 602, the virtual block-device driver can read a transaction entry in the journal. The transaction entry can include a block identifier and a status flag, see for example operation 508 in FIG. 5. As noted above, a transaction entry can remain in the journal if the write operation associated with that transaction failed to complete due a reboot (e.g., power failure) during execution of the write operation. In embodiments, where the block storage device is a physical device (e.g., FIG. 2), this operation can be performed by the device firmware during the power up sequence in the physical block storage device.

At operation 604, the virtual block-device driver can process the transaction entry against the block metadata 116. As explained above, the block metadata 116 can contain information (metadata) for each block in the block storage device. In some embodiments, the block-device driver can access an entry in the block metadata 116 that corresponds to the block identifier portion of the transaction entry, and update the metadata corresponding to the identified block with the status flag portion of the transaction entry. In embodiments, where the block storage device is a physical device (e.g., FIG. 2), this operation can be performed by the device firmware during the power up sequence in the physical block storage device.

Processing of the Block Metadata During Read Operations

Figure 7:
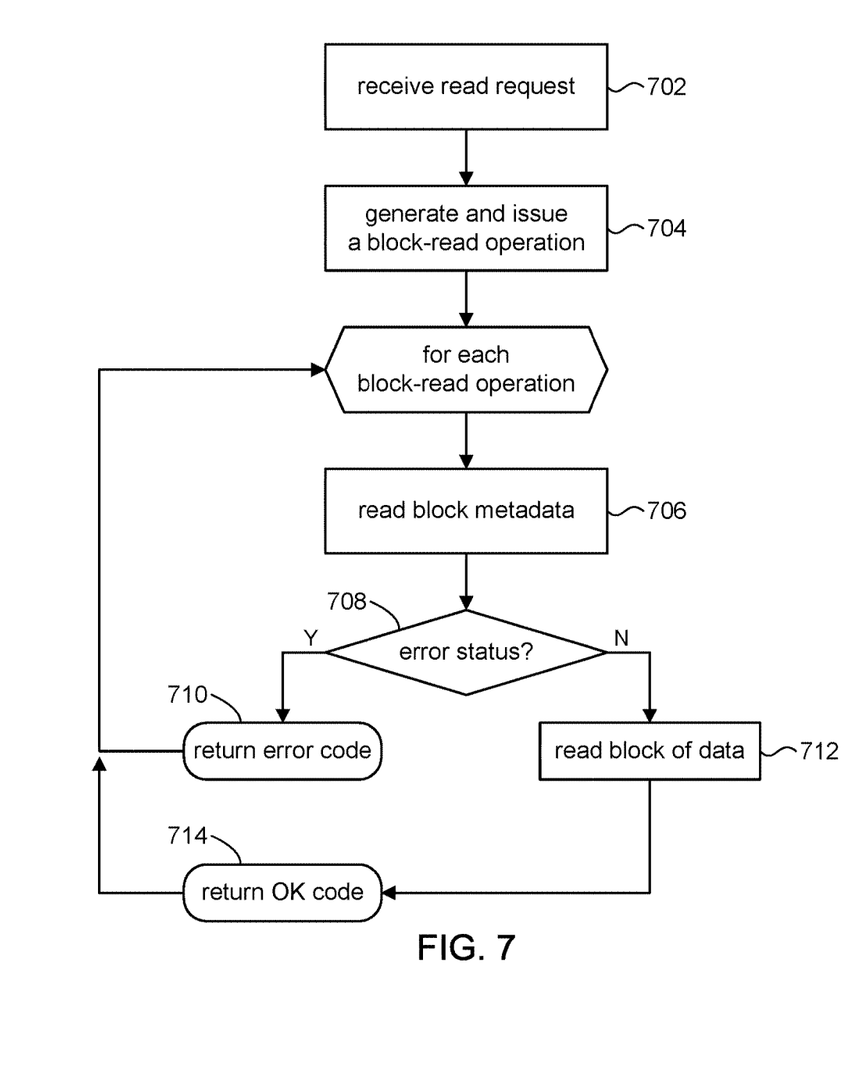
FIG. 7 shows a workflow for processing a device driver read operation.

Referring to FIG. 7, the discussion will now turn to a high level description of processing in a virtual bock-device driver (e.g., 106, FIG. 1) to provide atomic writes on a block storage device (e.g., 112, FIG. 1, 212, FIG. 2) in accordance with the present disclosure. In some embodiments, for example, the block-device driver can include computer executable program code, which when executed by a computer system (e.g., 402, FIG. 4), may cause the computer system to perform the processing in accordance with FIG. 7. The following description will note differences for embodiments that use a physical block storage device such shown in FIG. 2, where processing in accordance with FIG. 7 can be performed by the device firmware.

At operation 702, the operating system (e.g., OS 22) can receive read request from an application executing on the OS. The read request can include a pointer to memory to hold the data to be read and a byte count of the number of bytes of data to read.

At operation 704, the operating system can process the read operation to generate one or more block-read operations that can be issued to the block storage device. In some embodiments, for example, each block-read operation can read in a block of data from the block storage device. For each block-read operation, the operating system can invoke the virtual block-device driver (e.g., 106, FIG. 1, 206, FIG. 2) via a suitable block-device API (e.g., 24). In some embodiments, each invocation can include an identifier of a target block on the block storage device to be read, and a pointer in memory to store the data.

At operation 706, the block-device driver can access the block metadata (e.g., 116, FIG. 1) to determine the status of the block to be read. In embodiments, where the block storage device is a physical device (e.g., FIG. 2), this operation can be performed in the device firmware.

At operation 708, if the block metadata indicates an error, the block-device driver can return a suitable error code (operation 710). Otherwise at operation 712, the block-device driver can access the block storage device to read a block of data from the target block identified in the block-read operation, and store that data beginning at the memory location specified by the pointer. The block-device driver can return a suitable code at operation 714. In embodiments, where the block storage device is a physical device, this operation can be performed in the device firmware.

Figure 8:
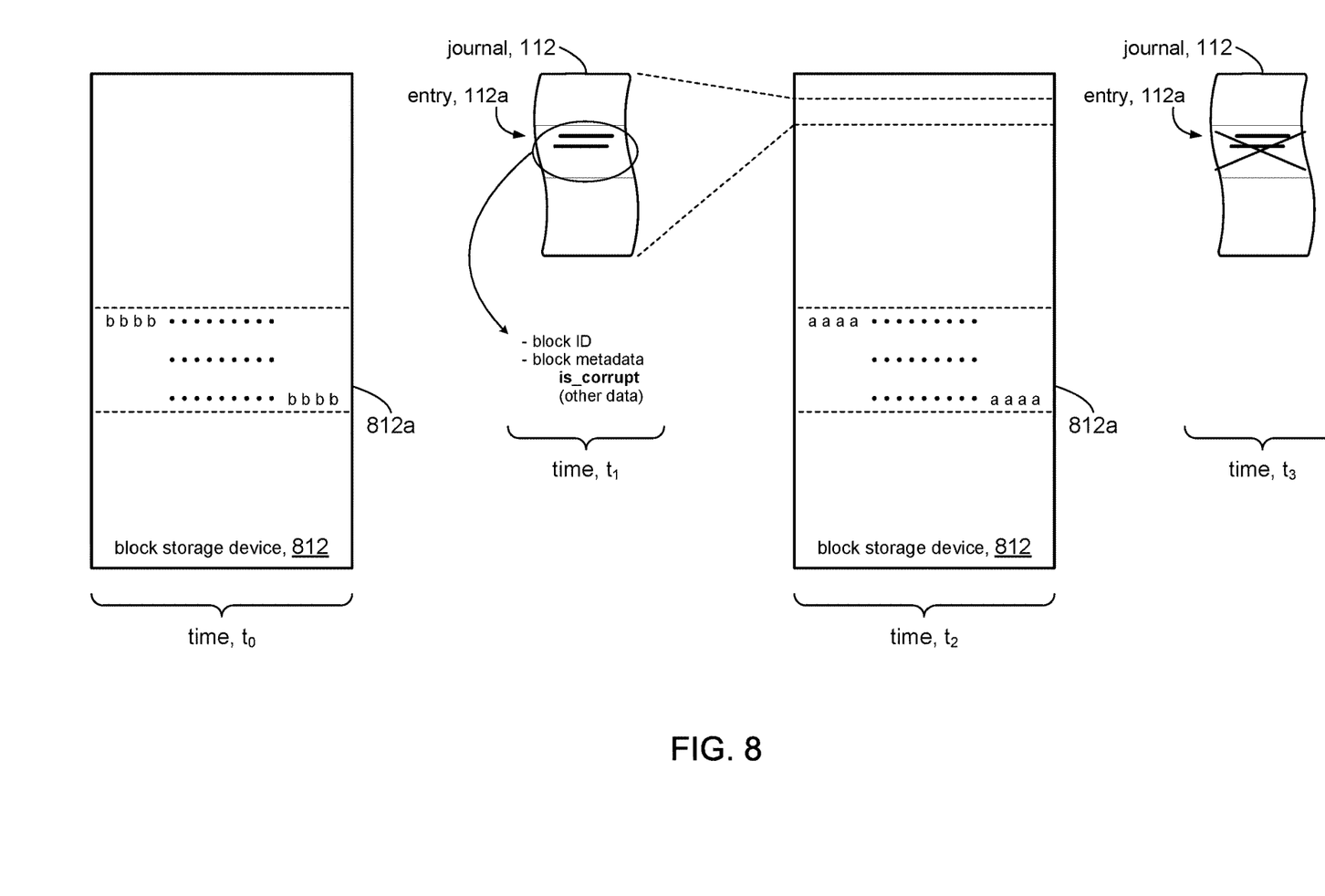
FIG. 8 illustrates processing in a journal during a device driver write operation in accordance with the present disclosure.

FIG. 8 illustrates a time sequence for a write operation to a data block 812a in a block storage device 812 in accordance with the present disclosure where the block of data is successfully committed to the block storage device. At time $t_0$, suppose the data in block 812a in the block storage device 812 contains all b's.

At time $t_1$, suppose a write operation comes in for a block of data containing all a's. As explained above, the block-device driver can create and commit a transaction entry 112a in the journal 112. The figure shows that, in some embodiments, the journal 112 can be allocated from the block storage device 812. The journal entry 112a identifies the target block (block ID) of the write operation and includes a status flag (e.g., is_corrupt) to indicate, as a default, that the write operation resulted in an error. In accordance with the present disclosure, the journal entry 112a does not include a copy of the data (e.g., all a's) that is to be written.

At time $t_2$, the block of data (e.g., all a's) is written to the target block 812a in the block storage device 812. As noted above, the actual writing of data to the block storage device 812 does not begin until the transaction entry 112a has been committed to the journal 112. Assuming for discussion purposes that the data is committed, then at time $t_3$ the transaction entry 112a can be deleted or otherwise canceled from the journal 112. Thus, in the case of a successful write operation, where the data is committed to the block storage device 812, the is_corrupt status flag in the transaction entry 112a is of no consequence since the transaction entry is deleted from the journal 112.

Figure 9A:
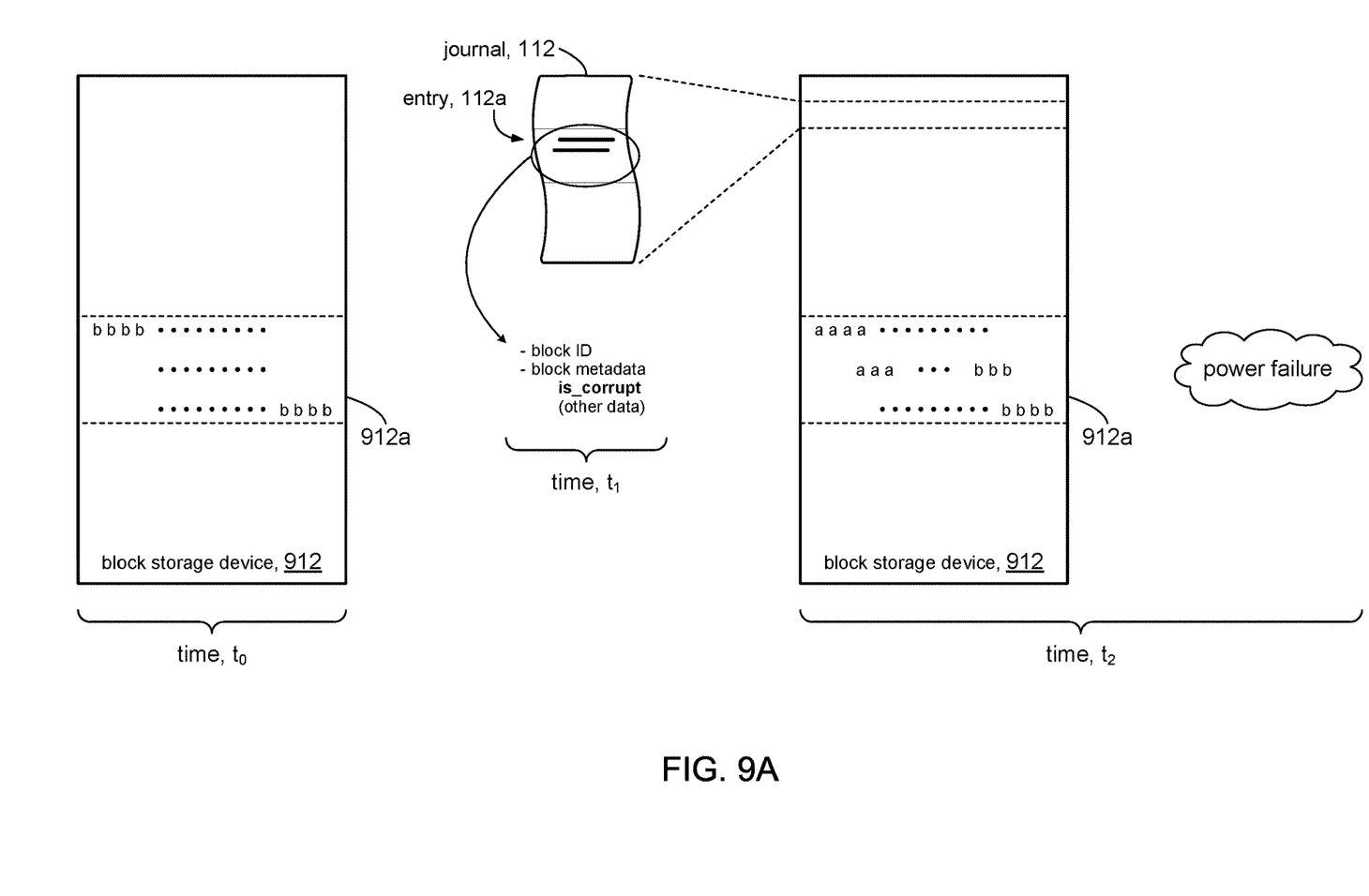
FIGS. 9A and 9B illustrates the interplay between a journal and block metadata in accordance with the present disclosure.
Figure 9B:
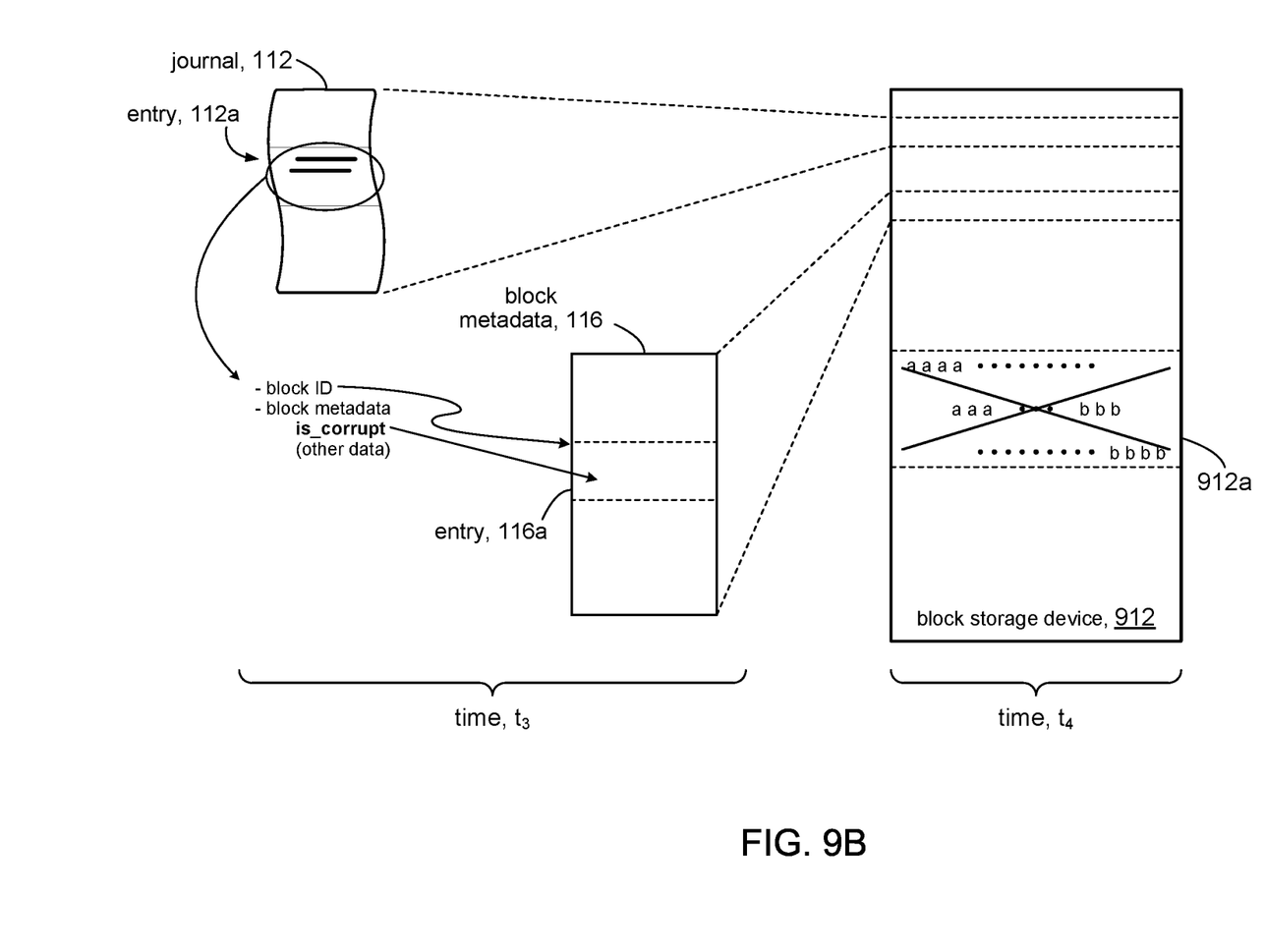

FIGS. 9A and 9B is a time sequence for a write operation to a data block 912a in a block storage device 912 to illustrate the interplay between the journal 112 and block metadata 116 in accordance with the present disclosure where the write operation is interrupted power failure prior to the data being committed to the block storage device 912. As in FIG. 8, suppose at time $t_0$ the data in block 912a in the block storage device 912 contains all b's.

At time $t_1$, suppose a write operation comes in for a block of data containing all a's. As explained above, the block-device driver can create and commit a transaction entry 112a in the journal 112 that identifies the target block (block ID) of the write operation and a status flag (is_corrupt) to indicate, as a default, that the write operation resulted in an error.

At time $t_2$, suppose a power failure (or other cause) results in the computer system shutting down in the middle of writing the block of data (e.g., all a's) to the target block 912a. FIG. 9 shows that at time of the power failure, the state of the target block 912a can contain some new data and some old data.

Referring to FIG. 9B, at some time $t_3$, the computer system may be powered up or rebooted. As explained above, during the boot up process, transactions in the journal 112 can be replayed, including replaying the transaction entry 112a associated with the write operation that did not complete. As explained in FIG. 6, replaying the transaction entry 112a includes writing the entry to an entry 116a in the block metadata 116 that corresponds to the block ID, and in particular writing the is_corrupt status flag into the block metadata entry 116a. In some embodiments, the is_corrupt status flag can be a code that is already defined in accordance with particular standard for block I/O used in the computer system, such as SCSI, NVMe, and so on. For example, a corrupt block on the storage device 912 may indicate that one or more storage cells in that block are damaged and thus unreadable. In the present disclosure, the "corrupt" designation can include block with torn writes (e.g., 912a). This can be useful, since the OS may already be configured to process or otherwise respond to blocks on the storage device that are corrupt. A subsequent read operation on that block will result in an error (e.g., operations 706, 708, 710, FIG. 7).

It can be seen from the above description of the figures, that the present disclosure provides a journaling mechanism for supporting atomic write operations that exhibits significantly reduced write-bandwidth as compared to conventional techniques. In some embodiments, the journaling exploits the corrupted flag in the block metadata that is maintained for each block of a disk. The present disclosure first commits a transaction in the journal indicating the block is corrupted before writing the data block. Note that, this transaction is not replayed so the actual block metadata is not modified yet. Then the actual data block is written. Upon successful writing the transaction in the journal is aborted. In the case of failure, the data block is deemed corrupted and the journal is replayed on next restart so that the block metadata is modified to indicate the block is corrupted.

If the user reads this block, it will get an error indicating the data is corrupted, and in some embodiments may receive the corrupted data. If the OS can deal with the partially written (torn) blocks, it can take appropriate action; otherwise, the OS can reset the block. The error code that is sent back to the application (e.g., operation 710, FIG. 7) can serve as a positive indication that the block is corrupt, which allows the application to take appropriate action if any.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for writing data to a block device, the method comprising:
   receiving, by a computer system, a block-write operation to write a block of data to the block device;
   storing, by the computer system, a transaction associated with the block-write operation to a journal, the transaction comprising a block identifier that identifies a target block in the block device that is a destination of the block-write operation and an error code to serve as a default status indicative of failure of the block-write operation;
   subsequent to completion of storing the transaction to the journal, writing, by the computer system, the block of data associated with the block-write operation to the target block in the block device; and
   subsequent to completion of writing the block of data to the target block, canceling, by the computer system, the transaction associated with the block-write operation from the journal,
   wherein when the computer system reboots prior to completion of writing the block of data to the target block:
      the transaction remains in the journal; and
      subsequent to the computer system rebooting, the computer system stores the error code contained in the transaction into metadata associated with the block of data to inform a subsequent read operation that writing the block of data to the target block did not complete.

2. The method of claim 1, wherein the default status further indicates the target block is corrupted.

3. The method of claim 1, wherein the computer system is a virtual machine host system, the method further comprising receiving the block-write operation from a guest operating system (OS) executing on a virtual machine that is instantiated on the virtual machine host system.

4. The method of claim 1, wherein the computer system is a virtual machine host system that is configured to support containers.

5. The method of claim 1, further comprising emulating the block device by providing a block device interface to a non-block-based storage device, the block device interface including the block-write operation.

6. The method of claim 5, wherein the non-block-based storage device is a byte-addressable persistent memory.

7. The method of claim 1, further comprising:
   receiving a write request from an application comprising a plurality of data to be written; and
   issuing one or more block-write operations to write the plurality of data in units of blocks of data to the block device.

8. The method of claim 1, wherein the block-write operation is an operation defined in accordance with a specification for conducting TO with block devices, wherein the default status is an error code defined by the specification for conducting TO with block devices.

9. A non-transitory computer-readable storage medium having stored thereon computer executable instructions, which when executed by a computer device, cause the computer device to:
   receive a block-write operation to write a block of data to the block device;
   store a transaction associated with the block-write operation to a journal, the transaction comprising a block identifier that identifies a target block in the block device that is a destination of the block-write operation and an error code to serve as a default status indicating that the block-write operation did not succeed;
   subsequent to completion of storing the transaction to the journal, write the block of data associated with the block-write operation to the target block in the block device; and
   subsequent to completion of writing the block of data to the target block, cancel the transaction associated with the block-write operation from the journal,
   wherein when the computer device reboots prior to completion of writing the block of data to the target block:
      the transaction remains in the journal; and
      subsequent to the computer device rebooting, the computer device stores the error code contained in the transaction into metadata associated with the block of data to inform a subsequent read operation that writing the block of data to the target block did not complete.

10. The non-transitory computer-readable storage medium of claim 9, wherein the computer system is a virtual machine host system, the method further comprising receiving the block-write operation from a guest operating system (OS) executing on a virtual machine that is instantiated on the virtual machine host system.

11. The non-transitory computer-readable storage medium of claim 9, wherein the computer system is a virtual machine host system that is configured to support containers.

12. The non-transitory computer-readable storage medium of claim 9, wherein the computer executable instructions, which when executed by the computer device, further cause the computer device to emulate the block device by providing a block device interface to a non-block-based storage device, the block device interface including the block-write operation.

13. The non-transitory computer-readable storage medium of claim 12, wherein the non-block-based storage device is a byte-addressable persistent memory.

14. The non-transitory computer-readable storage medium of claim 9, wherein the computer executable instructions, which when executed by the computer device, further cause the computer device to:
receive a write request from an application comprising a plurality of data to be written; and
issue one or more block-write operations to write the plurality of data in units of blocks of data to the block device.

15. The non-transitory computer-readable storage medium of claim 9, wherein the block-write operation is an operation defined in accordance with a specification for conducting TO with block devices, wherein the default status is an error code defined by the specification for conducting TO with block devices.

16. An apparatus comprising:
one or more computer processors; and
a computer-readable storage medium comprising instructions for controlling the one or more computer processors to be operable to:
receive a block-write operation to write a block of data to the block device;
store a transaction associated with the block-write operation to a journal, the transaction comprising a block identifier that identifies a target block in the block device that is a destination of the block-write operation and an error code to serve as a default status that the block-write operation did not succeed;
subsequent to completion of storing the transaction to the journal, write the block of data associated with the block-write operation to the target block in the block device; and
subsequent to completion of writing the block of data to the target block, cancel the transaction associated with the block-write operation from the journal,
wherein when the apparatus reboots prior to completion of writing the block of data to the target block:
the transaction remains in the journal; and
subsequent to the apparatus rebooting, the apparatus stores the error code contained in the transaction into metadata associated with the block of data to inform a subsequent read operation that writing the block of data to the target block did not complete.

17. The apparatus of claim 16, wherein the computer system is a virtual machine host system, the method further comprising receiving the block-write operation from a guest operating system (OS) executing on a virtual machine that is instantiated on the virtual machine host system.

18. The apparatus of claim 16, wherein the computer system is a virtual machine host system that is configured to support containers.

19. The apparatus of claim 16, wherein the computer executable instructions, which when executed by the computer device, further cause the computer device to emulate the block device by providing a block device interface to a non-block-based storage device, the block device interface including the block-write operation.

20. The apparatus of claim 19, wherein the non-block-based storage device is a byte-addressable persistent memory.

\* \* \* \* \*